June 5, 1934.                J. F. WHITE                1,961,539
                        ARTIFICIAL FISH LURE
                    Original Filed Sept. 22, 1930
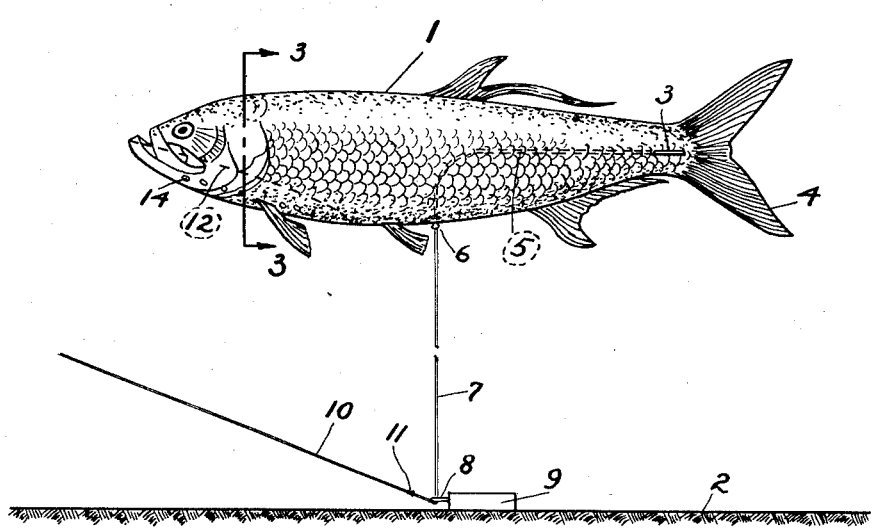
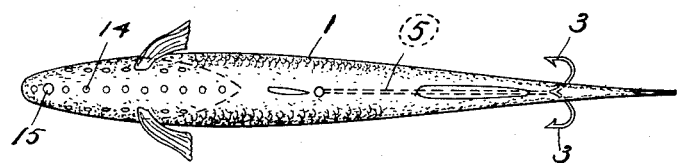
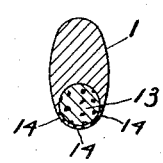
INVENTOR.
JAMES F. WHITE.
BY
Munn + Co
ATTORNEYS.

Patented June 5, 1934

1,961,539

UNITED STATES PATENT OFFICE 1,961,539

ARTIFICIAL FISH LURE

James F. White, Richmond, Calif., assignor of one-half to Stanley E. Hallander, Richmond, Calif.

Application September 22, 1930, Serial No. 483,646
Renewed October 23, 1933

2 Claims. (Cl. 43—46)

My invention relates to improvements in artificial fish lures, and it consists in the combinations, constructions and arrangements hereinafter described and claimed.

I have found that bait which will give off a fish oil into the water will cause fish to strike where they would not do so if the bait did not give off the fish oil. This is borne out by the fact that hooks baited with fish meat will attract fish soon after the baited hook is thrown into the water. If the bait remains in the water a short length of time, it will become water soaked, and having given up all of its oil, it will no longer attract fish.

The principal object of my invention is to provide an artificial fish lure which is made into various shapes in accordance with the type of fish it is desired to catch. Certain kinds of fish prefer certain kinds of bait. The lure is provided with a recess in which a substance for attracting fish is placed. As soon as the bait is placed in the water, this substance will be given off into the water and will attract fish.

A further object of my invention is to provide an artificial lure which is buoyant and which will therefore remain above the bed of the stream or other body of water. It is the tendency of fish to strike at the rear of the bait, and for this reason I place the hooks at the rear of the fish lure.

Other objects and advantages will appear as the specification proceeds, and the novel features of the invention will appear as the specification proceeds.

My invention is illustrated in the accompanying drawing, in which:

Figure 1 is a side elevation of one form of the device,

Figure 2 is a bottom plan view, and

Figure 3 is a section along the line 3—3 of Figure 1.

In carrying out my invention I provide a fish lure indicated generally at 1 which may be of any size and shape desired and may be made from any material. The lure is preferably buoyant so as to rise above the bed 2 of the water. I have shown the lure in Figure 1 as being in the shape of a fish, and it is obvious that shapes of different fishes may be used for catching different kinds of fish.

If desired, the body 1 can be made of rubber so as to be bouyant, and this body carries fish hooks 3 (see Figure 2) that are disposed adjacent to the tail 4. The hooks 3 are connected to a common wire 5 that extends through the body of the fish to its middle and terminates in an eyelet 6 at the bottom of the lure 1. A leader 7 is secured to the eyelet 6, and this is passed through an eyelet 8 of a weight 9. The leader 7 is secured to a fishing line 10 by a nut 11, and the line 10 extends to the fishing pole (not shown).

A recess 12 is formed in any desired part of the body 1 and in this recess I dispose pieces of cork 13 (see Figure 3). The body 1 has perforations 14 placing the recess in communication with the water in which the fish lure floats. I have shown the recess 12 at the bottom of the fish, but it is obvious that this recess can be placed at the top or any other part without departing from the spirit and scope of the invention. A larger opening 15 is provided near the mouth of the fish, and a fish-attracting substance such as fish oil can be poured into the opening 15 and this will be absorbed by the cork 13 or other absorbent material. The device is now ready to be used.

From the foregoing description of the various parts of the device, the operation thereof may be readily understood.

The bait and sinker are thrown into the water and the sinker will immediately drop to the bed 2 and the fish lure 1 will float above the weight, and this distance can be regulated by the length of the leader 7. Since the leader 7 is secured substantially at the midpoint of the fish lure, the lure will be able to swing about the leader and somewhat simulate the movements of a living fish. The line 10 can be agitated for causing the leader 7 to move the lure 1 vertically a slight distance.

As soon as the water penetrates the recess 12 by means of the openings 14, it will cause the fish oil to slowly exude from the cork 13 and to pass out through the openings 14 and to rise in the water. This oil will attract the fish and will cause the fish to strike far more quickly. The oil will slowly seep out, and therefore the lure will continue to attract the fish for a considerable time.

Although I have shown and described one embodiment of my invention, it is to be understood that the same is susceptible of various changes, and I reserve the right to employ such changes as may come within the scope of the claims hereto annexed.

I claim:

1. An artificial buoyant fish lure comprising a body in the shape of a fish, a hook secured to the body, a line extending from the hook, and a weight having an opening for the line to pass therethrough, whereby a moving of the line will cause the lure to move vertically in the water.

2. An artificial buoyant fish lure comprising a body in the shape of a fish, a hook secured to the body, a line extending from the hook, and a weight having an opening for the line to pass therethrough, whereby a moving of the line will cause the lure to move vertically in the water, the line extending from the center and underside of the body to the weight.

JAMES F. WHITE.